३,४७२,६२३
PROCESS FOR THE RECOVERY OF TELLURIUM FROM COMPLEX SOLUTIONS OF CHLORIDES

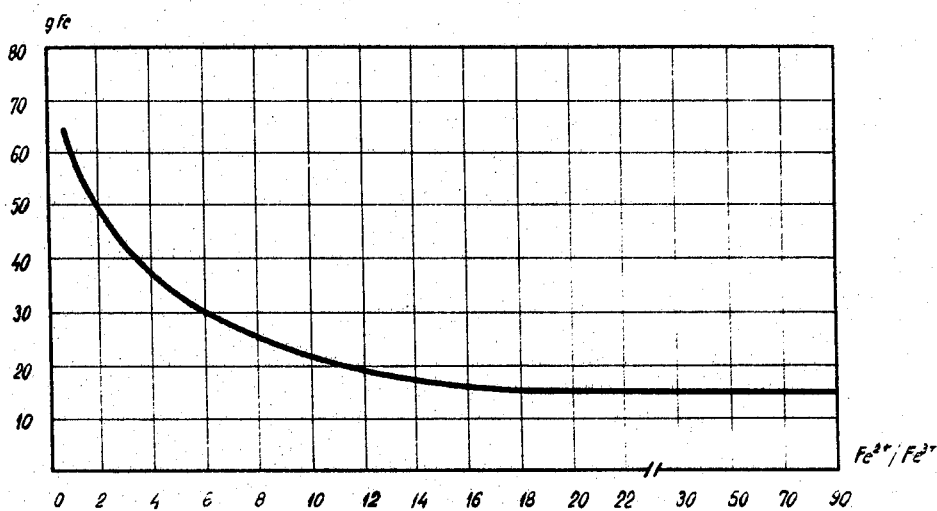

Anuta Moscovici, Nicolae Maricuta, and Elizabeta Cocosco, Bucharest, Rumania, assignors to Ministerul Industriei Chimice, Bucharest, Rumania, a corporation of Rumania
Filed Feb. 27, 1967, Ser. No. 618,941
Claims priority, application Rumania, Mar. 4, 1966, 51,073
Int. Cl. C01b *19/00;* C22b *7/00*
U.S. Cl. 23—209                                            2 Claims

ABSTRACT OF THE DISCLOSURE

The tellurium in complex solutions of chlorides, obtained by treating concentrates of non-ferrous metals with solutions of ferric chloride, is extracted by concentration with iron wastes, the required quantity being about 18 g./l. for a molar ratio ferrous iron to ferric iron in the solution higher or equal to 16, increasing up to 65 g./l. in proportion as the ratio $Fe^{2+}:Fe^{3+}$ approaches zero.

---

The present invention relates to a process for the separation or recovery of tellurium from complex solutions of chlorides obtained by treating complex concentrates of non-ferrous metals with acidic solutions of ferric chloride.

It is known to recover tellurium from the complex concentratese which usually contain it. This process generally provides for the extraction in a first phase or step of the non-ferrous metals contained in the concentrate by dissolving them with an acid solution; in a second phase or step, tellurium is separated at low temperature by cementation with metallic aluminum.

This process cannot be economically applied in the case of complex solutions of chlorides obtained when the concentrates are treated with acid solutions of ferric chloride as this latter operation is carried out with optimum yields only at relatively elevated temperatures of 95–110° C. and, therefore, the complex solutions of chlorides at such temperatures, must be cooled for obtaining a quantitative cementation of tellurium with aluminum.

On the other hand by using aluminum as cementating agent, the aluminum remaining in the treated solution increases the degree complexing of the solution. This effect should be taken into consideration in the further operations for extracting the other non-ferrous metals contained in the complex solution of chlorides. Also due to the more complex cementation activity of aluminum, which corresponds to its electrochemical potential as related to the other metals in solution as chlorides, it follows that the resulting precipitate will be characterized not only by a greater number of components but also by a reduced tellurium content, which fact will complicate the purification operations.

The process for recovering tellurium from the complex solutions of chlorides obtained by treating the complex concentrates of non-ferrous metals with acidic solutions of ferric chloride according to the present invention excludes the above mentioned disadvantages, in that it allows treatment of these solutions at any temperature; one obtains, therefore, a complete separation of tellurium from these solutions at the temperatures at which they are available, without prior cooling. Moreover, the complexity of the solution of chlorides is not increased and a raw product rich in tellurium is obtained.

The process of the invention makes use of the cementation of tellurium by means of iron powder, spongy iron, or even under the form of iron chips. Iron, in one of the mentioned forms, is added to the hot complex solution of chlorides having a temperature of about 90° C. its amount being of not less than 18 g. to one liter of solution when the ratio of ferrous iron to ferric iron ($Fe^{2+}/Fe^{3+}$) existing in the solution of chlorides has a value higher than 16 and the amount being of maximum 65 g. per liter when the ratio ferrous iron to ferric iron existing in the solution is very near to zero, in accordance with the empirically determined values represented by the graph of the drawing.

Three examples of the application of the process according to the invention are given as follows, by using the enclosed graph for determining the necessary iron amount as reported to the content of ferrous iron and ferric iron in the solution containing tellurium.

EXAMPLE 1

To 5 liters of hot solution (60° C.) of chlorides obtained by treating complex concentrates of non-ferrous metals with hot solutions of ferric chloride containing among others: 0.244 g. Te/l., 154 g. $Fe^{2+}$/l., 12 g. $Fe^{3+}$/l., 32.8 g. Cu/l., and 73 g. HCl/l. where the ratio $Fe^{2+}:Fe^{3+}$ is 12.8. An amount of 90 g. iron powder is added under stirring. The stirring is continued for further 30 minutes. 100% of tellurium is precipitated in the obtained cement, which due to the complexity of the treated solution contains 14.3% Te together with other metals. The indicated iron quantity corresponding to five liters of solution of chlorides was obtained from the graph, where, for a ratio $Fe^{2+}:Fe^{3+}$ of 12.8, the corresponding quantity of iron for cementation is 18 g. iron/l. of solution.

EXAMPLE 2

By operating at 60° C. as above, to five liters solution of chlorides obtained as above and which contains among others: 0.067 g. Te/l., 106 g. $Fe^{2+}$/l., 17 g. $Fe^{3+}$/l., 23.4 g. Cu/l., and 73 g. HCl/l. and whose ratio $Fe^{2+}:Fe^{3+}$ is 6.2, there is added under stirring 5×26=130 g. iron under the form of chips. After stirring for 30 minutes, while tellurium is precipitated in proportion of 100%, a cement containing 1.5% Te is obtained.

EXAMPLE 3

To five liters solution of chlorides obtained as in the previous example, which contains among others 0.244 g. Te/l., 106 g. $Fe^2$/l., 17 g. $Fe^{3+}$/l., 23.4 g. Cu/l., and 73 g. HCl/l. and whose ratio $Fe^{2+}:Fe^{3+}$ is 6.2, there are added under stirring 130 g. iron chips by obtaining a cement containing 5.3% Te, in this latter case, the initial temperature of the solution was 60° C. The tellurium separated in the cement from the complex solutions of chlorides as shown above is to be extracted and purified by any of the known methods.

We claim:
1. A process for the recovery of tellurium from a complex solution formed by the treatment of non-ferrous metal concentrates with acidic ferric chloride at an elevated temperature, comprising the step of precipitating the tellurium by cementation by adding to said solution without materially cooling it a quantity of metallic iron in the form of iron powder, iron sponge or iron chips in an amount ranging between 18 g./l. to 65 g./l. in accordance with the graph of the drawing when the atomic ratio of ferrous ion to ferric ion is at least 16 and approaches zero, respectively, the temperature of said solution upon addition of the said metallic iron being at most 90° C.

2. The process defined in claim 1 wherein said solution comprises substantially 0.067 to 0.244 g. tellurium per liter, 154 g. ferrous ion per liter, 12 to 17 g. ferric ion per liter, 23.4 to 32.8 g. copper per liter and 73 g. HCl per liter, the quantity of said metallic iron being substantially 18 to 26 g./l. of solution, the temperature being substantially 60° C.

References Cited

UNITED STATES PATENTS

| | | | |
|---|---|---|---|
| 2,981,595 | 4/1961 | Tuwiner | 23—50 |
| 2,990,248 | 6/1961 | Vaaler | 23—139 |
| 3,387,928 | 6/1968 | Doumas | 23—139 |

FOREIGN PATENTS

| | | |
|---|---|---|
| 126,875 | 5/1959 | Russia. |

OSCAR R. VERTIZ, Primary Examiner

G. T. OZAKI, Assistant Examiner

U.S. Cl. X.R.

75—99